United States Patent
Chandra et al.

(10) Patent No.: US 8,245,226 B2
(45) Date of Patent: Aug. 14, 2012

(54) OFFLINE MIGRATION FROM PRIOR OPERATING SYSTEM INSTALLATION

(75) Inventors: Arunesh Chandra, Sammamish, WA (US); Terrance James Dolan, IV, Issaquah, WA (US); David Henrickson, Woodinville, WA (US); Calin Voicu Negreanu, Lake Oswego, OR (US); Joseph Albert Robles, III, North Bend, WA (US); Michael James Day, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 735 days.

(21) Appl. No.: 12/353,057

(22) Filed: Jan. 13, 2009

(65) Prior Publication Data
US 2010/0180281 A1 Jul. 15, 2010

(51) Int. Cl.
G06F 9/455 (2006.01)
(52) U.S. Cl. .............................. 718/1; 718/100; 711/161
(58) Field of Classification Search .................. None
See application file for complete search history.

(56) References Cited

U.S. PATENT DOCUMENTS

| | | | |
|---|---|---|---|
| 5,710,917 A | 1/1998 | Musa et al. | |
| 6,370,646 B1 | 4/2002 | Goodman et al. | |
| 6,606,744 B1 | 8/2003 | Mikurak | |
| 6,738,970 B1 | 5/2004 | Kruger et al. | |
| 6,795,966 B1 * | 9/2004 | Lim et al. ........................ | 718/1 |
| 6,920,555 B1 | 7/2005 | Peters et al. | |
| 6,938,039 B1 | 8/2005 | Bober et al. | |
| 7,080,102 B2 | 7/2006 | O'Connell et al. | |
| 7,165,059 B1 | 1/2007 | Shah et al. | |
| 7,210,131 B2 | 4/2007 | Schmidt et al. | |
| 7,243,089 B2 | 7/2007 | Becker et al. | |
| 7,356,816 B2 | 4/2008 | Goodman et al. | |
| 7,437,614 B2 | 10/2008 | Haswell et al. | |
| 7,536,598 B2 | 5/2009 | Largman et al. | |
| 7,603,391 B1 | 10/2009 | Federwisch et al. | |
| 7,904,435 B2 | 3/2011 | Goyal et al. | |
| 2004/0187104 A1 | 9/2004 | Sardesai et al. | |
| 2005/0033718 A1 | 2/2005 | Rettig et al. | |
| 2005/0086457 A1 | 4/2005 | Hohman | |
| 2005/0091286 A1 | 4/2005 | Fineberg et al. | |
| 2006/0026587 A1 | 2/2006 | Lemarroy et al. | |
| 2007/0113226 A1 | 5/2007 | Baron et al. | |
| 2007/0130305 A1 * | 6/2007 | Piper et al. ..................... | 709/223 |

(Continued)

OTHER PUBLICATIONS

"User State Migration Tool 3.0", 2008, retrieved at <<http://technet.microsoft.com/en-us/library/cc722032.aspx>>, Oct. 1, 2008, p. 1.

(Continued)

*Primary Examiner* — Emerson Puente
*Assistant Examiner* — Dong Kim

(57) ABSTRACT

Migration of data relevant to, or associated with, one or more users from a prior operating system installation to a new operating system installation can be performed with reference to an archive of some or all of the data on a storage media made prior to the installation of a new operating system. Manifests associated with operating system components can be referenced to identify data to be transferred from those operating system components to new versions of those components. Independently generated manifests can also be referenced to migrate the files and data for one or more application programs, such as popular or commonly found application programs. User data and files to be migrated can be identified by loading registration database files from the offline operating system in the new operating system, or otherwise parsing a similar construct from the offline operating system.

19 Claims, 10 Drawing Sheets

U.S. PATENT DOCUMENTS

| | | | |
|---|---|---|---|
| 2008/0034071 A1* | 2/2008 | Wilkinson et al. | 709/220 |
| 2008/0077605 A1 | 3/2008 | Vasu | |
| 2008/0114830 A1* | 5/2008 | Welingkar et al. | 709/203 |
| 2009/0055507 A1* | 2/2009 | Oeda | 709/216 |
| 2009/0094603 A1 | 4/2009 | Hiltgen et al. | |
| 2009/0198731 A1* | 8/2009 | Noonan, III | 707/104.1 |
| 2009/0228629 A1* | 9/2009 | Gebhart et al. | 711/6 |
| 2010/0114825 A1* | 5/2010 | Siddegowda | 707/638 |

OTHER PUBLICATIONS

"Supporting Users and Troubleshooting a Microsoft Windows XP Operating System", retrieved at <<http://catalogimages.wiley.com/images/db/pdf/0782143520.excerpt.pdf>>, Aug. 6, 2004, pp. 1-32.

"Migration Using File System Links", Filed on 6th Jun. 2008, U.S. Appl. No. 12/134,206, pp. 20.

"Data and Settings Migration", Retrieved at <<http://www.dell.com/downloads/global/services/Data_datasheet.pdf>>, Mar. 2007, p. 1.

"Data Migration", http://publib.boulder.ibm.com/infocenter/tssfsv21/index.jsp?topc=/com.ibm.sanfs.doc/foe0_c_data_migration.html.

"Working with File Systems", Date: Nov. 3, 2005, pp. 1-49, Copyright: 2008, Microsoft Corporation, http://technet.microsoft.com/en-us/library/bb457112.aspx.

Bonkenburg, et al. "LifeBoat—An Autonomic Backup and Restore Solution", Date: Nov. 2004, p. 1-13.

Heck, et al. "An Implementation of an Applicative File System Technical Report 354", Springer Lecture Notes in Computer Science, 1992, pp. 1-17.

\* cited by examiner

OFFLINE MIGRATION FROM PRIOR OPERATING SYSTEM INSTALLATION

BACKGROUND

The ubiquitous nature of computing devices has facilitated ever increasing amounts of time that users spend interacting with, and modifying, their computing devices. Such modifications include the installation of software application programs that enable users to perform useful tasks on their computing devices. Such modifications also include changes to various settings, including settings specific to a single application program or operating system of the computing device, and settings that are more universally applied across some or all of the application programs and the operating system. For example, users can customize the display of text on their computing device, the color schemes utilized in the visual display presented by the computing device, the quantity of material automatically saved by the computing device, the locations of various files on the computing device, and other such settings. Additionally, users can generate content on the computing device that can be either saved in separate files, or can be incorporated into various application programs. For example, users can add one or more bookmarked locations to a web browser application program or can add one or more contacts to an email application program.

When a user attempts to change the operating system of their computing device, such as by upgrading to a newer version of that operating system, by reinstalling the same version of the operating system, or by utilizing the same, or different, version of the operating system on a new computing device, many of these modifications that the user made to make their interactions with the computing device more convenient can be lost. Because an operating system is, by definition, the basis upon which all other software applications rely in their interactions with the computing device, changing the operating system of a computing device without affecting any of the software application programs installed thereon is analogous to attempting to change a tablecloth after the table has already been set for a multi-course meal. As such, traditionally, users performing an operating system change have been instructed to install the new operating system on an empty storage device and manually transfer all of their settings to the new operating system as they manually installed the software application programs that were installed on the prior operating system.

Systems designed to aid in operating system changes, such as in the installation of a new operating system, often attempt to merely replace files that were associated with a prior operating system. As an initial matter, such a strategy may only preserve application program settings and user modifications to the extent that the new operating system being installed does not differ, in a material way, from the prior operating system. Operating system preferences and user modifications may still not be retained. Furthermore, the exchanging of operating system files can result in various application software incompatibilities with the new operating system, or other similar undesired effects.

SUMMARY

To preserve user-adjusted aspects of the user's interaction with a computing device while changing the operating system of the computing device, various mechanisms can be utilized to retrieve data from the computing device, as such data existed prior to the operating system change. An archive of some or all of the data on the computing device can be made to facilitate the retrieval of such data.

In one embodiment, manifests associated with operating system components can direct the retrieval of data from archived operating system components and the application of such retrieved data to new operating system components. The manifests associated with operating system components can be associated with the prior operating system's components or the new operating system's components.

In another embodiment, new operating system components can provide manifests that either replace equivalent manifests of the prior operating system's components or are utilized due to a lack of manifests of the prior operating system's components. The replacement of existing manifests can be performed prior to the retrieval of data from prior operating system components in accordance with the manifests.

In a further embodiment, manifests can be provided to define the data to be obtained from specific archived application programs. Such manifests can be specific to the application program, and manifests for popular application programs can be provided. Generic manifests can likewise be provided that can define the data to be obtained from other application programs, such as application programs that conform to a particular storage procedure.

In a still further embodiment, the newly installed operating system can be utilized to load a registration database or similar construct from the prior operating system. Such a registration database can then be parsed to identify user directories, file directories, or other relevant storage locations comprising files or other data that are to be transferred to the new operating system installation.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Additional features and advantages will be made apparent from the following detailed description that proceeds with reference to the accompanying drawings.

DESCRIPTION OF THE DRAWINGS

The following detailed description may be best understood when taken in conjunction with the accompanying drawings, of which

DETAILED DESCRIPTION

Figure 1:
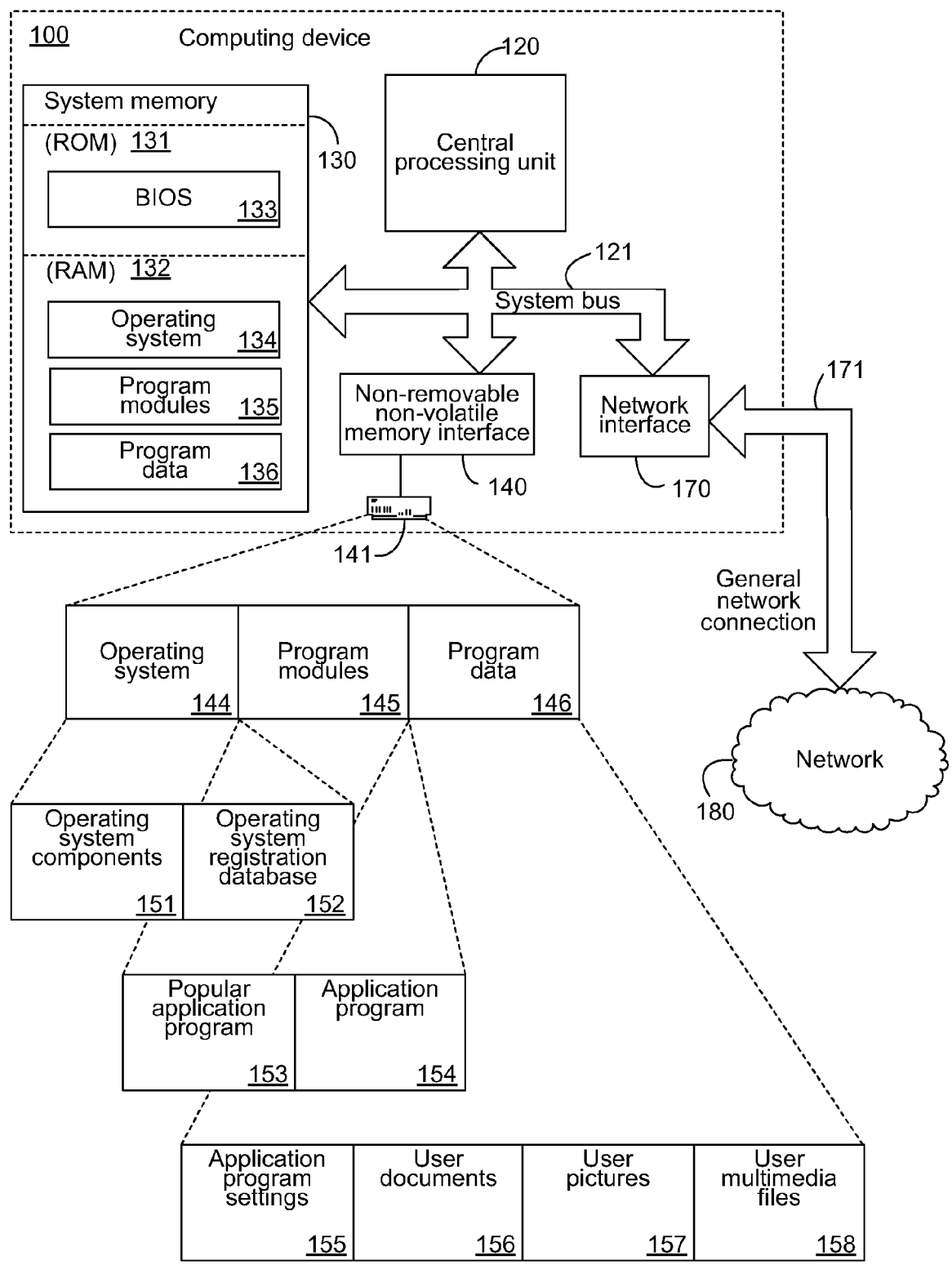
FIG. 1 is a block diagram of an exemplary computing device.

The following description relates to the migration of files and data from a prior operating system installation to a new operating system installation. Prior to the installation of the new operating system, an archive can be made of some or all of the files and data on the computing device. After the new operating system has been installed and is executing on the computing device, the archive can be accessed and information from such an offline operating system can be accessed and migrated to the new operating system. Manifests associated with operating system components can be referenced to determine what data from the archive is to be gathered, and how it is to be applied to the new operating system. Manifests can likewise be referenced for specific application programs, such as for popular application programs. Additionally, files associated with a registration database, or other similar construct, of the prior operating system can be loaded by the new operating system and parsed to identify users and files that are also to be migrated.

While the below descriptions are directed to the migration of data and files from a prior operating system installation to a new operating system installation, they are not so limited. Specifically, the descriptions below are equally applicable to the migration of data from a prior installation of an operating system to a new installation of that same operating system, such as would occur during an operating system "refresh", or if the user changed computing devices and installed the same operating system on the new computing device. Additionally, the below descriptions are equally applicable to the migration of data between a prior application program and a new application program. As such, references to an operating system are meant to be exemplary of the migration mechanisms described, and are not meant to limit the disclosures exclusively to operating system migrations. Similarly, references to a "prior" operating system and a "new" operating system are merely meant to distinguish various installations based on a temporal difference, and are not meant to require that the "new" operating system be a newer version of the "prior" operating system.

Although not required, the descriptions below will be in the general context of computer-executable instructions, such as program modules, being executed by one or more computing devices. More specifically, the descriptions will reference acts and symbolic representations of operations that are performed by one or more computing devices or peripherals, unless indicated otherwise. As such, it will be understood that such acts and operations, which are at times referred to as being computer-executed, include the manipulation by a processing unit of electrical signals representing data in a structured form. This manipulation transforms the data or maintains it at locations in memory, which reconfigures or otherwise alters the operation of the computing device or peripherals in a manner well understood by those skilled in the art. The data structures where data is maintained are physical locations that have particular properties defined by the format of the data.

Generally, program modules include routines, programs, objects, components, data structures, and the like that perform particular tasks or implement particular abstract data types. Moreover, those skilled in the art will appreciate that the computing devices need not be limited to conventional personal computers, and include other computing configurations, including hand-held devices, multi-processor systems, microprocessor based or programmable consumer electronics, network PCs, minicomputers, mainframe computers, and the like. Similarly, the computing devices need not be limited to a stand-alone computing device, as the mechanisms may also be practiced in distributed computing environments where tasks are performed by remote processing devices that are linked through a communications network. In a distributed computing environment, program modules may be located in both local and remote memory storage devices.

Turning to FIG. 1, an exemplary computing device 100, providing context for the below descriptions, is illustrated. As indicated previously, the descriptions below are equally applicable to the migration of data between two or more computing devices. Thus, references to, and diagrams of, a single computing device, such as the exemplary computing device 100, are strictly for ease of illustration and description, since the mechanisms described are equally applicable to both intra-computing device migrations, as shown, and inter-computing device migrations, which are not specifically, and separately, illustrated. The exemplary computing device 100 of FIG. 1 can include, but is not limited to, one or more central processing units (CPUs) 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures.

The computing device 100 also typically includes computer readable media, which can include any available media that can be accessed by computing device 100 and includes both volatile and nonvolatile media and removable and non-removable media. By way of example, and not limitation, computer readable media may comprise computer storage media and communication media. Computer storage media includes media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computing device 100. Communication media typically embodies computer readable instructions, data structures, program modules or other data in a modulated data signal such as a carrier wave or other transport mechanism and includes any information delivery media. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computing device 100, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, other program modules 135, and program data 136.

The computing device 100 may also include other removable/non-removable, volatile/nonvolatile computer storage media. By way of example only, FIG. 1 illustrates a hard disk drive 141 that reads from or writes to non-removable, nonvolatile magnetic media. Other removable/non-removable, volatile/nonvolatile computer storage media that can be used with the exemplary computing device include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140.

The drives and their associated computer storage media discussed above and illustrated in FIG. 1, provide storage of computer readable instructions, data structures, program modules and other data for the computing device 100. In FIG. 1, for example, hard disk drive 141 is illustrated as storing operating system 144, other program modules 145, and program data 146. Note that these components can either be the same as or different from operating system 134, other program modules 135 and program data 136. Operating system 144, other program modules 145 and program data 146 are given different numbers hereto illustrate that, at a minimum, they are different copies.

Additionally, the computing device 100 may operate in a networked environment using logical connections to one or more remote computers. For simplicity of illustration, the computing device 100 is shown in FIG. 1 to be connected to a network 180 that is not limited to any particular network or networking protocols. The logical connection depicted in FIG. 1 is a general network connection 171 that can be a local area network (LAN), a wide area network (WAN) or other network. The computing device 100 is connected to the general network connection 171 through a network interface or adapter 170 which is, in turn, connected to the system bus 121. In a networked environment, program modules depicted relative to the computing device 100, or portions or peripherals thereof, may be stored in the memory of one or more other computing devices that are communicatively coupled to the computing device 100 through the general network connection 171. It will be appreciated that the network connections shown are exemplary and other means of establishing a communications link between computing devices may be used.

For purposes of establishing context for the descriptions below, sub-elements for the operating system 144, other program modules 145 and program data 146 are also illustrated in FIG. 1. Specifically, the operating system 144 is shown as comprising one or more operating system components 151 and an operating system registration database 152, or similar construct. The program modules 145 can include popular application programs 153, such as ubiquitous word processing, spreadsheet, email or web browsing applications, and other application program 154, such as less well known utilities, limited-use application programs, or customized application programs. The program data 146 can comprise application program settings 155 for one or more of the popular application programs 153 or application programs 154. The program data 146 can likewise comprise files or components that are user-created, or otherwise comprise data associated with one or more users of the computing device 100. For example, the program data 146 can comprise collections of user documents 156, user pictures 157, and user multimedia files 158.

Figure 2:
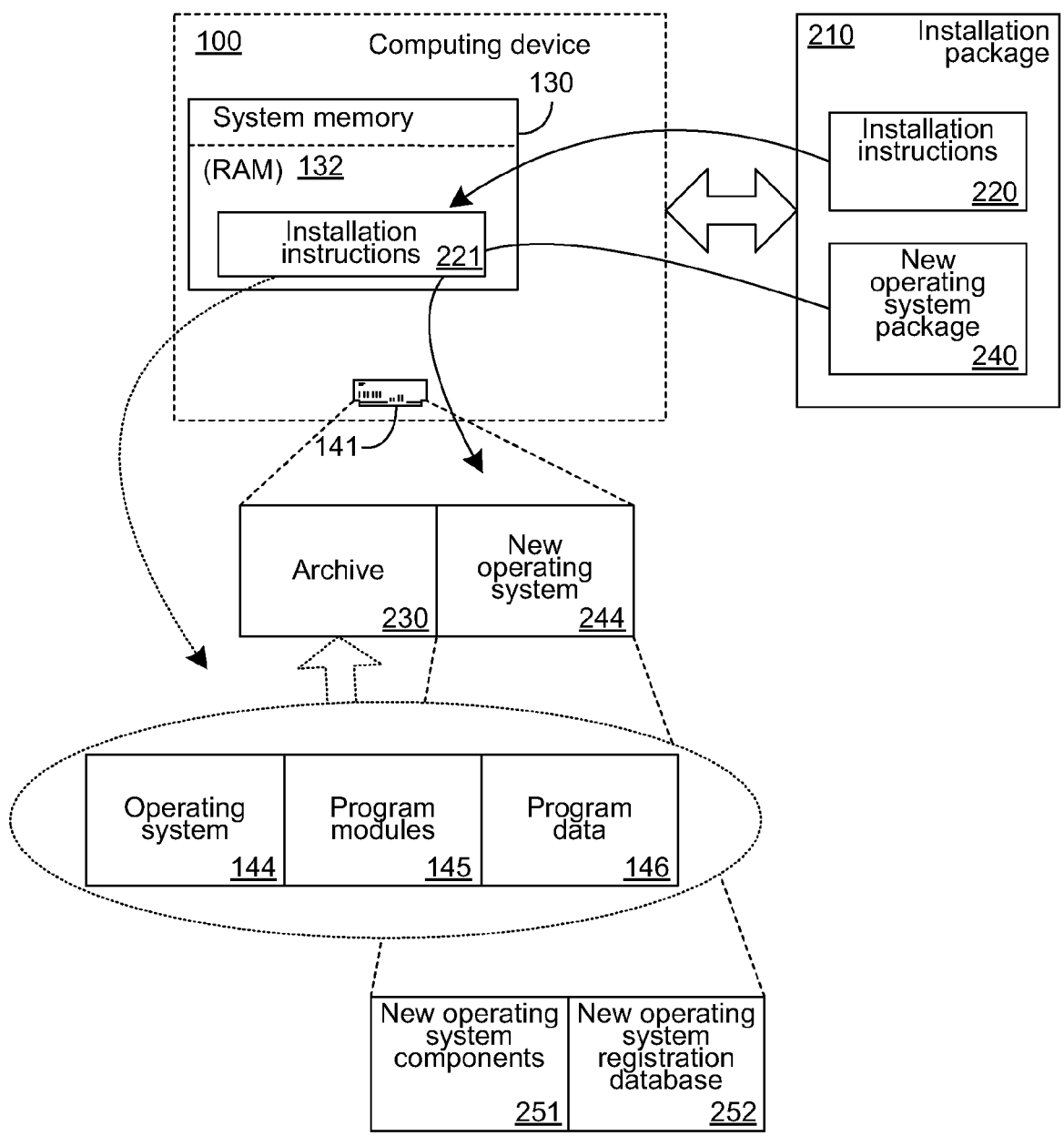
FIG. 2 is a block diagram of an exemplary operating system upgrade.

Turning to FIG. 2, a first portion of an exemplary change of the operating system 144 of the computing device 100 to a new operating system 244 is illustrated by system 200. Initially, an installation package 210 can be communicationally coupled to the computing device 100. In one embodiment, the installation package 210 can be resident on computer storage media that can be physically connected to the computing device 100, such as digital versatile disk (DVD) that can be inserted into a DVD drive coupled to the system bus 121 of the computing device 100. In another embodiment, the installation package 210 can be resident on a storage medium that can be communicationally coupled to the computing device 100 via the network connection 171, such as a disk image that can be resident on a server computing device.

The installation package 210 can comprise installation instructions 220 that can be executed by the CPU 120 of the computing device 100, and a package 240 comprising the new operating system 244. As illustrated by the system 200 of FIG. 2, the installation instructions 220 can, when executed by the computing device 100, be loaded into RAM 132 as installation instructions 221. As also indicated, as part of the execution of the loaded installation instructions 221, some or all of the information stored on the storage medium comprising the operating system 144, such as the hard disk drive 141, can be archived into the archive 230. In one embodiment, the archive 230 can comprise all of the information stored on, for example, the hard disk drive 141, including the operating system 144, the program modules 145, and the program data 146, together with all of the sub-components and categories described previously. In another embodiment, the material archived in to the archive 230 can be selected by the loaded and executing installation instructions 221, such as based on predefined criteria.

Subsequent to the creation of the archive 230, and the transfer of data into the archive, such as the operating system 144, the program modules 145 and the program data 146, the new operating system 244 can be installed onto the same storage medium, such as the hard disk drive 141 in the present illustrative example. The installation of the new operating system 244 can obtain the files and data that comprise the new operating system from the new operating system package 240 of the installation package 210. Additionally, the new operating system package 240 can comprise relevant guides that can be parsed by the executing installation instructions 221 to select the specific components of the new operating system 244 that are to be installed. In one embodiment, as illustrated, the new operating system 244, as installed, can comprise one or more new operating system components 251 and a new operating system registry database 252. If the new operating system 244 is a newer version of the operating system 144, at least some of the new operating system components 251 can be updated versions of the operating system components 151, now resident in the archive 230, and the new operating system registration database can be an updated version of the operating system registration database 152.

After the new operating system 244 has been installed on a storage media of the computing device 100, the computing device 100 can be restarted, or otherwise triggered to execute the new operating system 244 and not the operating system 144 present in the archive 230. In one embodiment, to avoid confusion, and potential conflicts among computer-executable instructions, the files and data contained in the archive 230 can be accessible only through limited mechanisms, or can otherwise appear packaged and not currently operational. Because the operating system 144 is no longer executing, it is referred to herein as being "offline."

The execution of the new operating system 244 can act as a host for one or more mechanisms, described below with reference to a migration tool 340, such as that illustrated in the system 300 of FIG. 3a. While reference will be made to a single such migration tool 340, the descriptions below are not meant to be limited by the packaging of the instructions for performing such mechanisms. Thus, reference to the migration tool 340 is meant to include other packaging of such mechanisms, such as in multiple components or other executable or non-executable files. The migration tool 340 can, in one embodiment, transfer data and files from the archive 230 to one or more intermediate files 350 and can also transfer data and files from the one or more intermediate files 350 into the new operating system 244 or otherwise onto a storage device of the computing device 100 that can be utilized and accessed by the new operating system. To illustrate transfers that are directed by the migration tool 340, rather than complicating the illustration of FIG. 3a, the relevant transfers and other actions are illustrated in gray, as is the migration tool 340 itself, to illustrate the association.

In one embodiment, the transferring of data and files referenced in the descriptions below can be a standard copy of the data, where bits are read from one location and written to another location. In an alternative embodiment, however, the transferring of data and files referenced below can be a modification to the links to a specific set of data maintained by a currently executing operating system, such as the new operating system 244. For example, the new operating system 244 can implement a file system in which a file structure comprises a pointer to the bits that comprise the file. Another, equivalent, file can then be generated by such a file system, not by copying the bits pointed to by the pointer from the first file, but rather by adding another pointer to those same bits, where that second pointer is associated with the other, equivalent, file. In such a case, the user may perceive that there now exist two copies of such a file, but the actual bits are not replicated on the storage medium. Thus, as utilized herein, the term "transfer" is meant to encompass both a physical copying of bits and a logical copying, such as would occur when another pointer to the same bits is created.

Figure 3A:
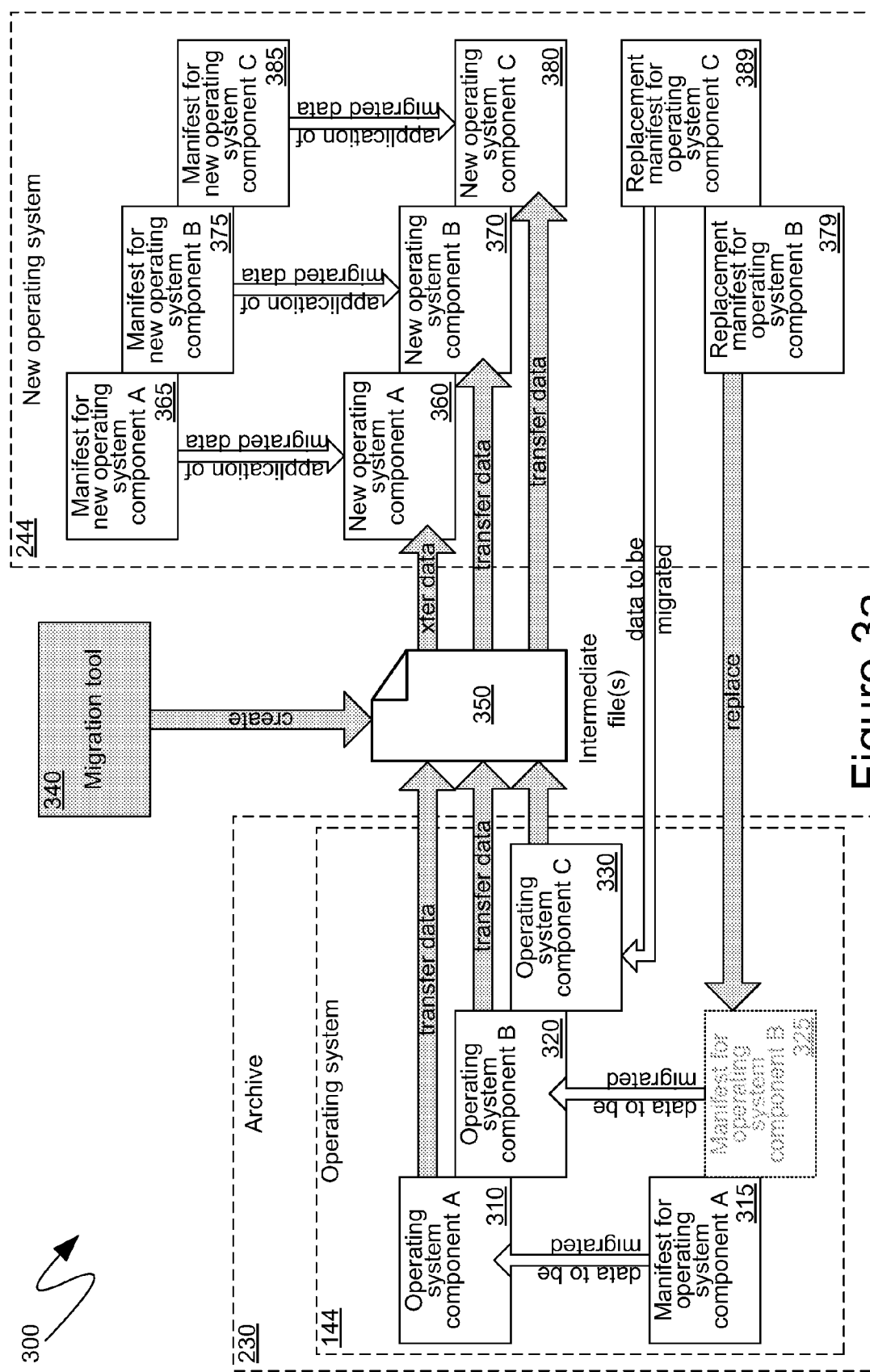
FIGS. 3a and 3b are block diagrams of alternative embodiments of one exemplary aspect of the migration of data from an archived operating system to a newly installed operating system.

Turning back to the system 300 of FIG. 3a, the transferring of data to the intermediate files 350 can, in one embodiment, be independent of the transferring of data from the intermediate files. Thus, for example, the intermediate files 350 can be created and then stored on a network drive for future reference. Alternatively, the intermediate files 350 can be a disk image or other backup storage container that can be referenced for backup, as well as migration purposes. In a similar manner, the archive 230 is illustrated within the context of an operating system change and, as such, is shown as comprising files and data from an operating system 144 that was previously executing on the computing device 100 which now has, installed upon it, and executing thereon, a new operating system 244. However, the archive 230 can, likewise, be a disk image, a networked storage location, a backup or any other source of files and data. Thus, as indicated previously, while the below descriptions are made with reference to an operating system change, they are equally applicable to other change, migration, or backup scenarios.

In one embodiment, illustrated by at least a portion of the system 300 of FIG. 3, the data, from specific operating system components associated with the now offline operating system 144, that are to be transferred to the intermediate files 350, can be identified by reference to one or more manifests, including manifests provided with, or otherwise associated with, the operating system 144. Thus, as shown, a component of the offline operating system 144, such as the operating system component 310, can have associated with it a manifest 315 that can also be part of the operating system 144. Such a manifest 315 can have been provided with the operating system 144 and can have been maintained by it.

The manifest 315 can describe and delineate various aspects of its associated operating system component, such as, in the present example, operating system component 310. At least one portion of the manifest 315 can describe what information, if any, is to be gathered from the component 310 and migrated to a new version of the component 310, such as the component 360 in the new operating system 244. In one embodiment, the manifest can be an XML file, or other extensible file type. The migration tool 340 can, as indicated, reference the manifest 315 and transfer the data of the operating system component 310 that is referenced by the manifest 315 into the intermediate file 350.

In another embodiment, an operating system component, such as operating system component 320 can have an associated manifest 325 that is part of the same operating system 144 as the component 320. A new operating system 244, however, can comprise a replacement manifest 379 for the manifest 325 of the prior operating system 144. In such a case, prior to parsing the manifest associated with the component 320, the migration tool 340 can first replace the existing manifest 325 with the replacement manifest 379 provided by the new operating system 244 for the component 320. In such a manner, a new operating system 244 can specify additional data, or different data, from the component 320 that may not have been deemed relevant when the manifest 325 was provided with the prior operating system 144 but has since, in the meantime, become relevant. For example, the new operating system component 370 that can be an updated version of the operating system component 320, may be able to utilize different or additional information from the operating system component 320 that would not have been identified by the prior manifest 325. In such a case, the new operating system 244 can provide the replacement manifest 379. After the migration tool 340 has replaced the manifest 325 with the replacement manifest 379, it can proceed to transfer the data specified by the replacement manifest 379 from the associated component 320 in the archived operating system 144 to the intermediate files 350.

In still another embodiment, a component of the operating system 144 may not have an associated manifest. Thus, for example, in the exemplary system 300 of FIG. 3, the operating system component 330 does not have, within the archived operating system 144, an associated manifest. In such a case, as in the case of the replacement manifest 379, described above, the migration tool 340 can check the new operating system 244 for a replacement manifest 389 associated with the component 330 of the archived operating system 330. If such a replacement manifest 389 exists, the migration tool 340 can utilize it to identify what data from the component 330 it can transfer to the intermediate files 350. Such a mechanism can be useful if, for example, the archived operating system 144 comprised components without associated manifests.

It is also possible that the archived operating system 144 was not a componentized operating system that would provide support for per-component manifests. More specifically, the archived operating system 144 may be multiple generations prior to the new operating system 244 and, when the operating system 144 was designed and distributed, the use of manifests, especially per-component manifests, such as those described above, may not have been implemented. In such a case, although not specifically illustrated in FIG. 3a, since the operating systems 144 and 244 of FIG. 3a are illustrated as having components, the migration tool 340 can reference the new operating system 244 for one or more "down-level" manifests that can have been provided with the new operating system 244 to enable the migration of data from such an operating system that does not have components or otherwise support per-component manifests. Such "down-level" manifests can be analogous to the manifests described above, except that they can focus on the data from the non-componentized operating system that is to be migrated and need not comprise some of the other information that the illustrated per-component manifests may comprise, such as, for example, information that is not relevant to the migration of data.

Once the migration tool has transferred the data from the components of the offline operating system 144, such as, for example, components 310, 320 and 330, it can end the first phase of its operation. In one embodiment, the intermediate file or files 350 created by the migration tool 340 can be retained for an indefinite amount of time and the transfer of the transferred data from such intermediate files to appropriate components within the new operating system 244, such as, for example, components 360, 370 and 380 can be performed at a later time. Indeed, should the user desire additional storage capacity on the storage media on which the archive 230 is stored, the user could even delete the archive 230 after the migration tool 340 has collected the relevant data into the intermediate files 350, but before such data has been further provided to the new operating system 244, for example. In another embodiment, as a fail-safe, the archive 230 can be retained until the migration of data is complete.

To complete the migration of the data that was collected into the intermediate files 350, the migration tool 340 can reference manifests that can be part of the new operating system 244. For example, operating system component 360 in the new operating system 244 can correspond to the operating system component 310 of the offline operating system 144. The operating system component 360 can have associated with it, in the new operating system 244, a manifest 365 that, like the manifest 315 associated with the operating system component 310 in the offline operating system 144, can describe and delineate various aspects of its associated operating system component, such as, in the present example, operating system component 360. One aspect of the information provided by the manifest 365 associated with the operating system component 360 can be information that can direct the migration tool 340 as to the proper location and association of the data collected into the intermediate files 350, at least as far as the component 360 is concerned. Thus, for example, the data transferred by the migration tool 340 from the operating system component 310, and placed within the intermediate files 350, can be transferred into the corresponding operating system component 360 in the new operating system 244, in accordance with its associated manifest 365. Similarly, the data transferred by the migration tool 340 from the operating system components 320 and 330, and placed within the intermediate files 350, can also be transferred into the corresponding operating system components in the new operating system 244, namely components 370 and 380, respectively, in accordance with those components' manifests, namely manifests 375 and 385, respectively.

Figure 3B:
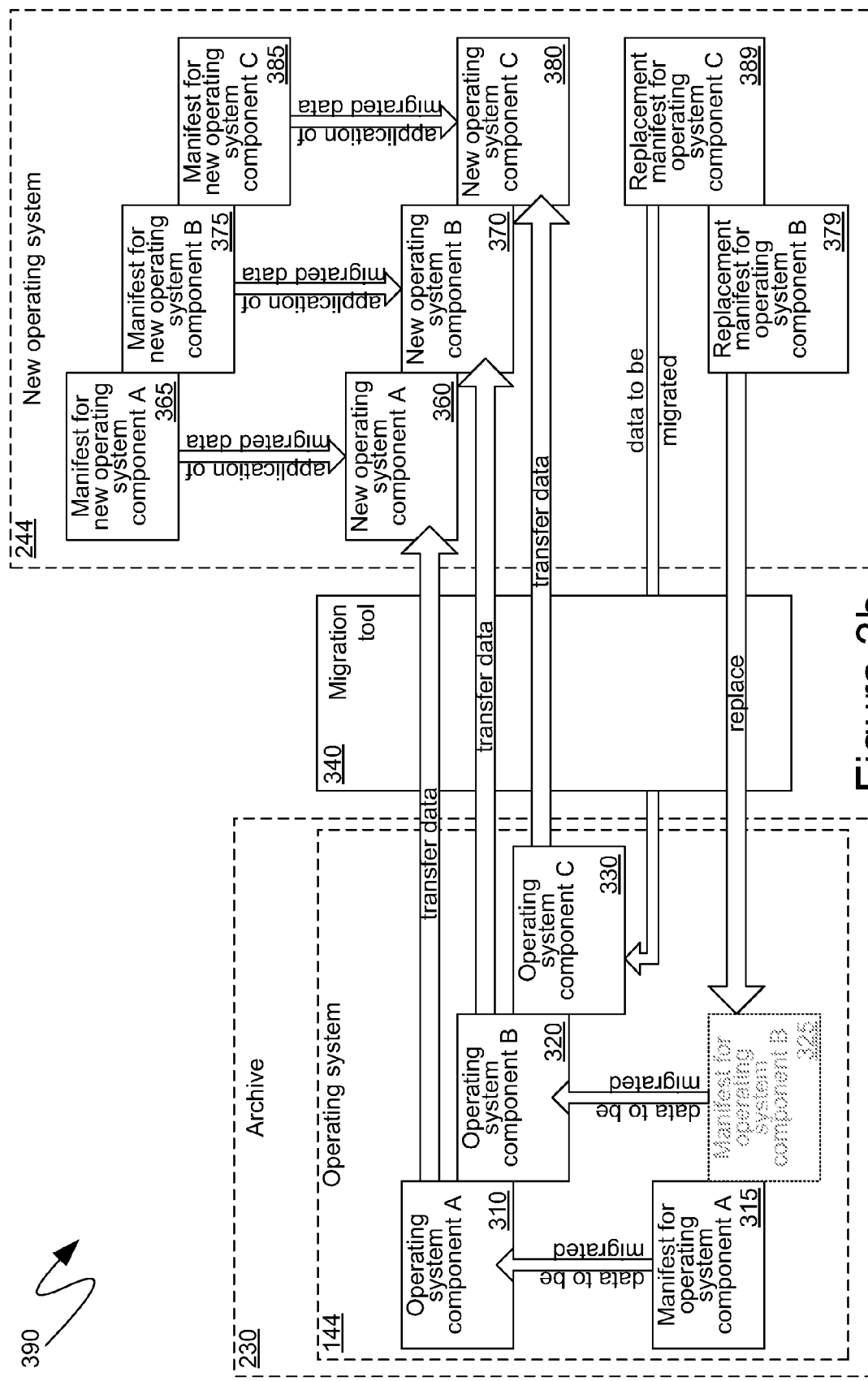

Once the data from the intermediate files 350, originally gathered from the archive 230, has been transferred into the appropriate components of the new operating system 244, the migration tool 340 can complete the migration of operating system data and can, optionally, cause the new operating system 244 to utilize the newly provided data, such as by restarting the computing device. In another embodiment, however, rather than creating and utilizing the one or more intermediate files 350, the migration tool 340, or similar mechanisms, can coordinate the transfer of data directly from the offline operating system 144 to the new operating system 244. Turning to FIG. 3b, such an alternative embodiment is illustrated with reference to the system 390 of FIG. 3b. As can be seen, the manifests, described above, that were referenced to identify the data to transfer from the operating system components 310, 320 and 330, can still be referenced in an equivalent manner and the manifests that were referenced to properly transfer the data into the components 360, 370 and 380 of the new operating system 244 can, likewise, be referenced in an equivalent manner. However, the transfer of data from the components 310, 320 and 330 to components 360, 370 and 380, respectively, can be coordinated by the migration tool 340, as shown, and can be performed directly, instead of through the one or more intermediate files 350, as illustrated in the system 300 of FIG. 3a.

Data from operating system components can be just one aspect of the data and files that can be migrated from the archive 230. Application programs and associated data, and user generated files, or other files that a user wishes to save and have access to, can likewise be migrated by the migration tool 340.

Figure 4A:
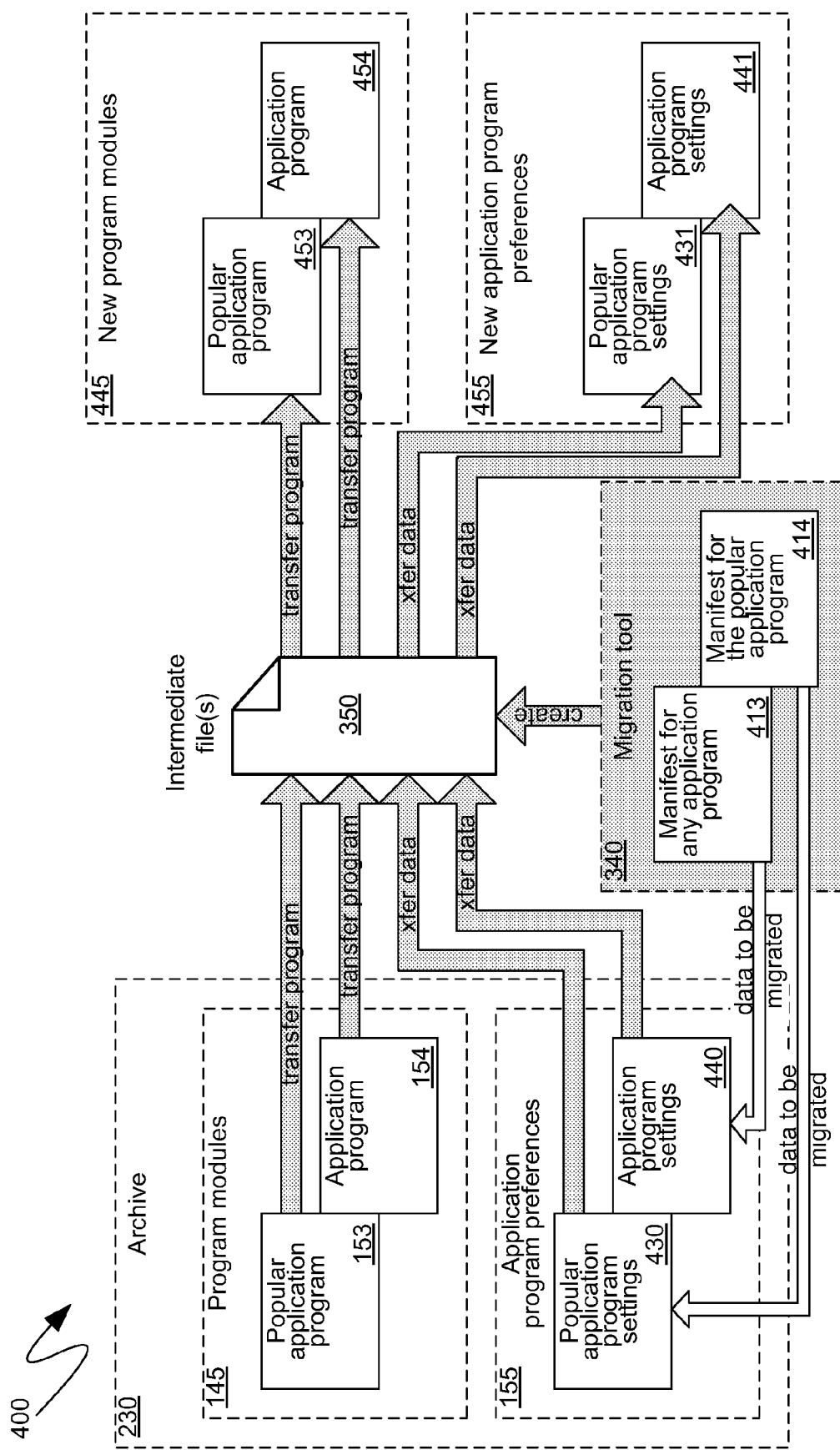
FIGS. 4a and 4b are block diagrams of alternative embodiments of an exemplary aspect of the migration of application programs and data from an archive to a newly installed operating system.

Turning to FIG. 4a, the system 400 illustrates an exemplary migration of application programs and associated data, such as application program settings or preferences, from the archive 230. As in FIG. 3a, for illustrative simplicity, rather than illustrating the appropriate arrows through the migration tool 340, transfers and other actions performed by the migration tool 340 are illustrated in gray, as is the migration tool 340 itself, to illustrate the association. In FIG. 4a, more specifically, the archive 230 can comprise, not only the operating system 144, as shown in FIGS. 3a and 3b, but also the program modules 145 and the application program preferences 155, as shown in FIG. 4a. As indicated previously, the program modules 145 can comprise popular application programs 153 and other application programs 154. The application program preferences 155 can then comprise settings 430 associated with the popular application programs 153 and settings 440 associated with the other application programs 155. As will be known by those skilled in the art, the settings or other preferences of an application can be maintained as separate files, or they can be maintained as components of the application program itself. The illustration, in FIG. 4a, and in FIG. 4b, referenced subsequently, of the settings 430 and 440 as separate entities from the application program modules 145, is not meant to limit the descriptions below to settings or preferences saved as separate files. Instead, the descriptions below are equally applicable to any application program settings or preferences that can be identified or accessed, irrespective of their container. Thus, the settings 430 and 440 are only meant to indicate such accessible or identifiable preferences or settings, and not any particular type of container for the same.

In one embodiment, the migration tool 340 can transfer the program modules 145, such as the popular application programs 153 and the other application programs 154, to the intermediate files 350. Such transferring can be performed for all of the program modules 145, for only specific program modules for which the migration tool 340 provides support, or for program modules selected by a user, such as through a user interface presented by, for example, the migration tool 340. The selection of which data, associated with the transferred application programs, should also be transferred to the intermediate files 350 can be informed by manifests in a similar manner to that described above.

Figure 4B:
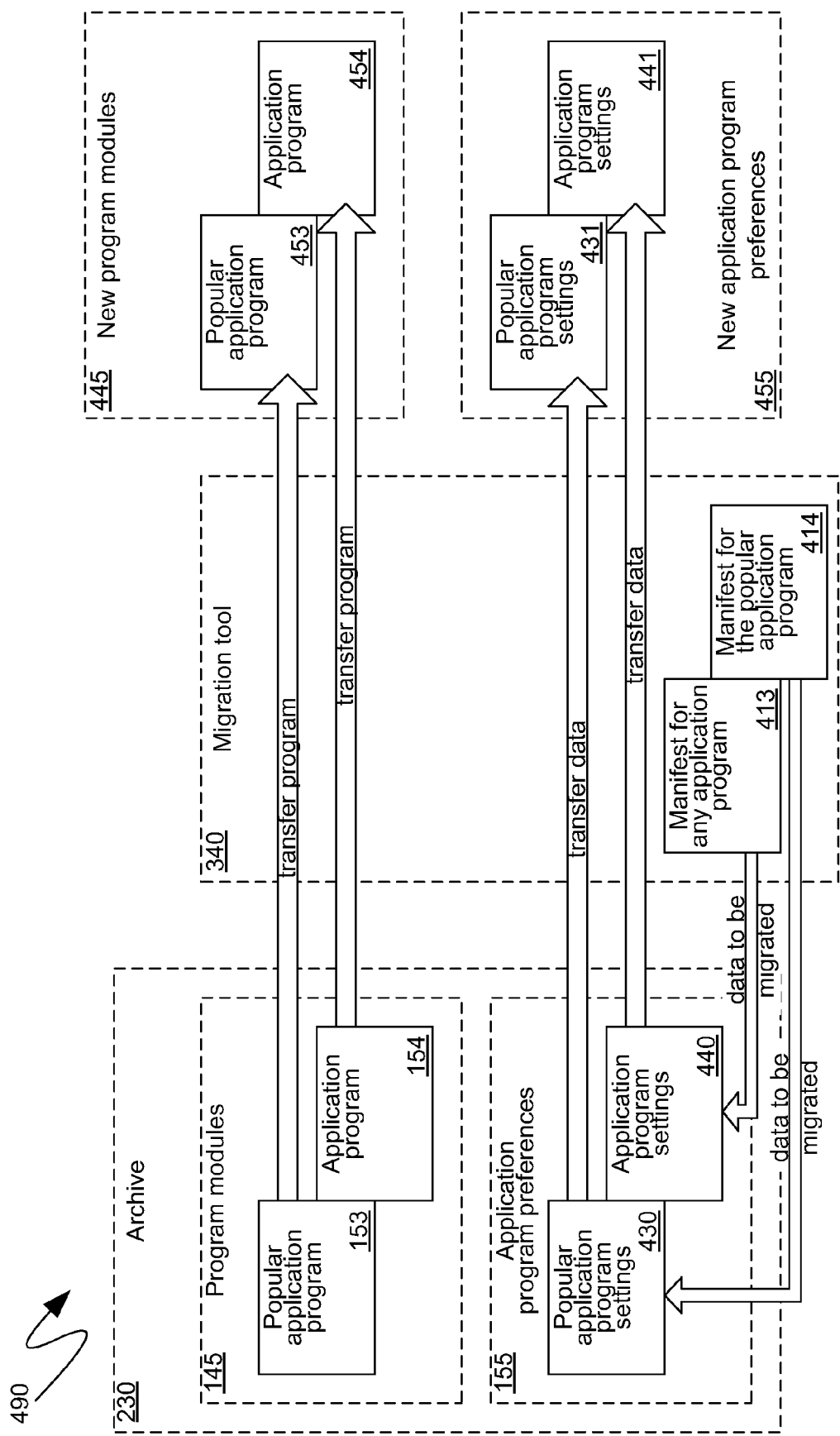

However, unlike an operating system, such as the operating system 144, which may comprise manifests associated with one or more components, including, for example, manifests created by those that created the associated component and thus, theoretically, are in an advantageous position to describe that component, application programs often do not comprise associated manifests. Thus, in one embodiment, the migration tool 340 can comprise, or otherwise reference manifests created for one or more of the program modules 145, such as the manifests 413 and 414. While the manifests 413 and 414 of FIGS. 4a and 4b are illustrated as being part of the migration tool 340, the illustration is only meant to indicate that they are provided in association with the migration tool 340 and not, for example, by the creators of the various program modules 145. In one embodiment, the manifests 413 and 414 can, actually, be packaged as data that is part of the migration tool 340, while in other embodiments they can be stored in one or more separate files, components or other data-retention structures that can be referenced, either directly or indirectly, by the migration tool 340.

For popular application programs 153, individual manifests, such as the manifest 413, can be generated. Thus, popular application programs 153 can be carefully examined and the relevant data generated or accessed by such programs, including, for example, the popular application program settings 430, can be identified and described in individual manifests, such as the manifest 414. In such a case, the manifest 414 can be referenced by the migration tool 340 when selecting data to be transferred from the popular application program settings 430 associated with the manifest 414. The migration tool 340 can then transfer the identified data to the intermediate files 350.

For application programs 154 that may not reach a level of ubiquity at which it is cost-effective to individually generate manifests, a generic manifest 413 can be referenced by the migration tool 340. Such a generic manifest 413 can identify application program settings 440 to be migrated in accordance with traditional application program guidelines, such as may have been provided by the operating system 144. For example, some operating systems provide a standardized mechanism, and storage area, within which application programs can store various settings or preferences. For application programs that behave in such a standardized manner, a generic manifest 413 may be able to identify a sufficient amount of data among the settings 440 of such application programs 154 to provide at least a minimum amount of migration. As with the manifest 414, the migration tool 340 can reference the generic manifest 413 to identify the application program settings 440 to transfer to the intermediate files 350.

As described previously, once the identified data and files have been transferred from the archive 230 to the intermediate files 350, the migration can be stopped indefinitely. To complete the migration, however, the transferred data and files can be obtained from the intermediate files 350 and transferred to, for example, the new program modules 445, which can be a new version of the program modules 145 from the archive 230, and the new application program preferences 455, which can be a new version of the application program preferences 155 also from the archive 230. In one embodiment, the migration tool 340 can again be invoked to perform such transferring and it can transfer the data into the popular application program settings 431 and the application program settings 441, in the manner described above. Specifically, the migration tool 340 can reference appropriate manifests, such as the manifests 413 and 414, to receive information as to how to store the data from the intermediate files 350 into the application programs 441 and 431, respectively.

As indicated previously with reference to the system 390 of FIG. 3b, in another embodiment, the transferring of data can be performed directly, without the use of the intermediate files 350. Thus, turning to FIG. 4b, a system 490 is shown, illustrating such an embodiment. As can be seen, the migration tool 340 can still cause the transfer of the application programs 153 and 154 to the new program modules 445. Additionally, the migration tool can still reference its manifests 413 and 414 to identify data to be transferred from the settings 430 and 440 to the settings 431 and 441, respectively, as described above. Unlike the embodiment illustrated in system 400 of FIG. 4a, the embodiment illustrated by system 490 of FIG. 4b provides for the direct transfer of both the programs 153 and 154 and the data from the settings 430 and 440, as illustrated, without utilizing the intermediate files 350.

Figure 5A:
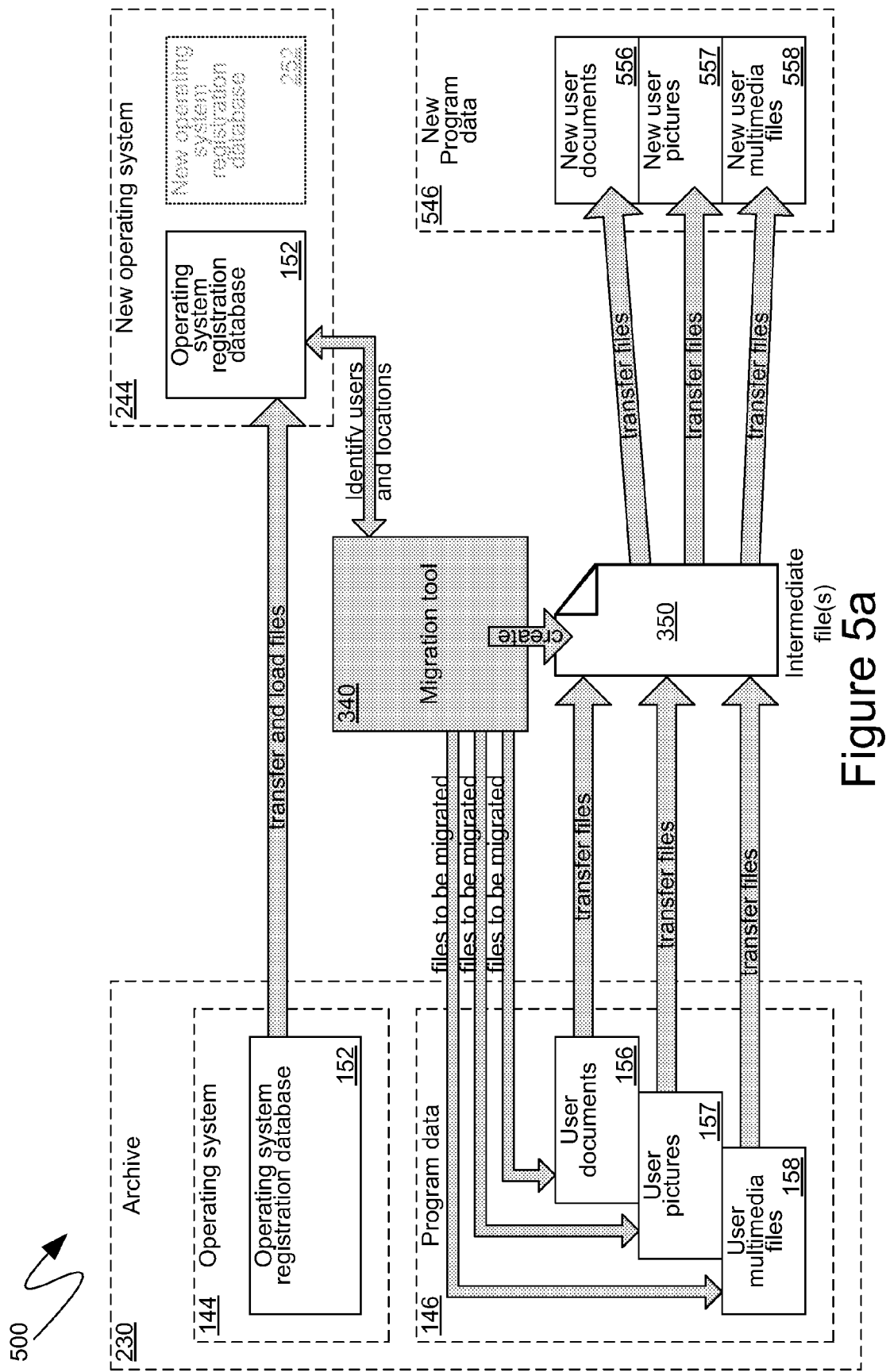
FIGS. 5a and 5b are block diagrams of alternative embodiments of another exemplary aspect of the migration of data from an archived operating system to a newly installed operating system.

In addition to the migrating of data and information from the offline operating system 144, and the offline program modules 145 and application program preferences 155, as described above, data and files associated with, utilized by, or otherwise important to one or more users of the computing device 100 can also be migrated. In one embodiment, the migration tool 340 can reference an operating system registration database 152, or other similar construct, to identify such files and data. Turning to FIG. 5a, the system 500 illustrates one embodiment for parsing the operating system registration database 152 of the offline operating system 144, to identify files and data to be transferred from the archive 230 to, for example, the intermediate files 350 and from there to new program data 546. As in FIGS. 3a and 4a, for illustrative simplicity, rather than illustrating the appropriate arrows through the migration tool 340, transfers and other actions performed by the migration tool 340 are illustrated in gray, as is the migration tool 340 itself, to illustrate the association. In FIG. 5a, specifically, as shown, the files and data that comprise the offline operating system's 144 operating system registration database 152 can be transferred to, or otherwise made available to, the new operating system 244 and can be loaded by the new operating system. The new operating system's 244 operating system registration database 252 can be temporarily inactivated or can otherwise not impact the loading of the operating system registration database 152 from the archive 230.

Once loaded by the new operating system 244, the operating system registration database 152 can be parsed by, for example, the migration tool 340, to identify relevant files and other data that can be transferred to the intermediate files 350. For example, the operating system registration database 152 can be parsed to identify the one or more users that had set up individual accounts within the context of the operating system 152. Such user's accounts can, then, be transferred to the intermediate files 350. Additionally, the identification of user accounts can further identify relevant files or other data important to such users. For example, each user account can have documents 156, pictures 157, multimedia files 158, or other information or data that was either generated by or saved by the user, or is otherwise important to the user.

In one embodiment, the operating system 144 can create specific folders, or other storage areas, for individual users to store specific files. Such specific folders can be stored within each user's directory and each user's directory can further be stored within specific portions of the file system maintained by the operating system 144. To identify the specific locations, the migration tool 340 can parse the operating system registration database 152, as loaded by the new operating system 244, and can then appropriately translate such locations into files or other data within the archive 230. Such locations are generically illustrated by the program data 146 and the user documents 156, pictures 157 and multimedia files 158 contained therein.

Once identified by the migration tool 340, the relevant files and data, such as, for example, the user documents 156, user pictures 157 and user multimedia files 158, can be transferred to the intermediate files 350. Although not specifically illustrated in the system 500 of FIG. 5, the migration tool 340 can also, in one embodiment, transfer relevant data from the operating system registration database 152 itself to the intermediate files 350. In another embodiment, the new operating system registration database 252 can be updated through traditional registration database maintenance mechanisms after the other files are transferred from the archive 230 and may not require much data, or any data at all, from the offline operating system registration database 152. As before, the data transferred to the intermediate files 350 can, either at that time, or at a later point in time, be transferred to, for example, new program data 546 which can comprise, or have created within it, new user documents 556, new user pictures 557 and new user multimedia files 558. The new user documents 556, the new user pictures 557 and the new user multimedia files 558 can be stored within folders or other directories or storage locations in a manner consistent with their storage in the program data 146 prior to its archiving, thereby enabling links or other identifications to remain operational and properly reference such files or data.

Figure 5B:
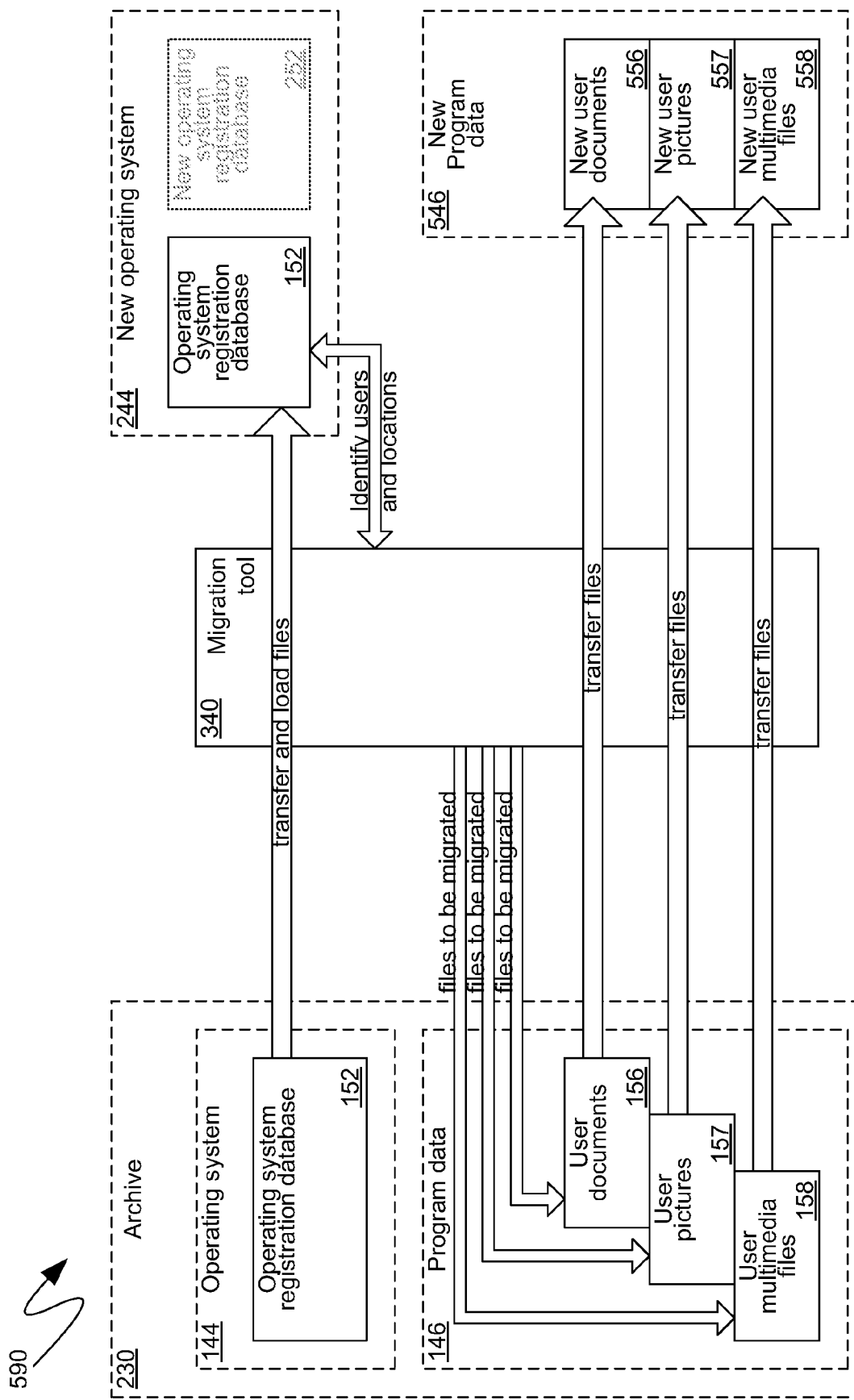

Turning to FIG. 5b, the system 590 illustrates an alternative embodiment for performing a transfer of the, for example, program data 146 to the new program data 546, as described above, except that, as illustrated, such a transfer can be coordinated by the migration tool 340 and can be performed directly instead of with reference to the intermediate files 350 described above with reference to the system 500 of FIG. 5a. Although not specifically illustrated, as above, the direct transfers coordinated by the migration tool 340 of system 590 can include transfers of files or data from the operating system registration database 152 to the new operating system registration database 252.

Figure 6:
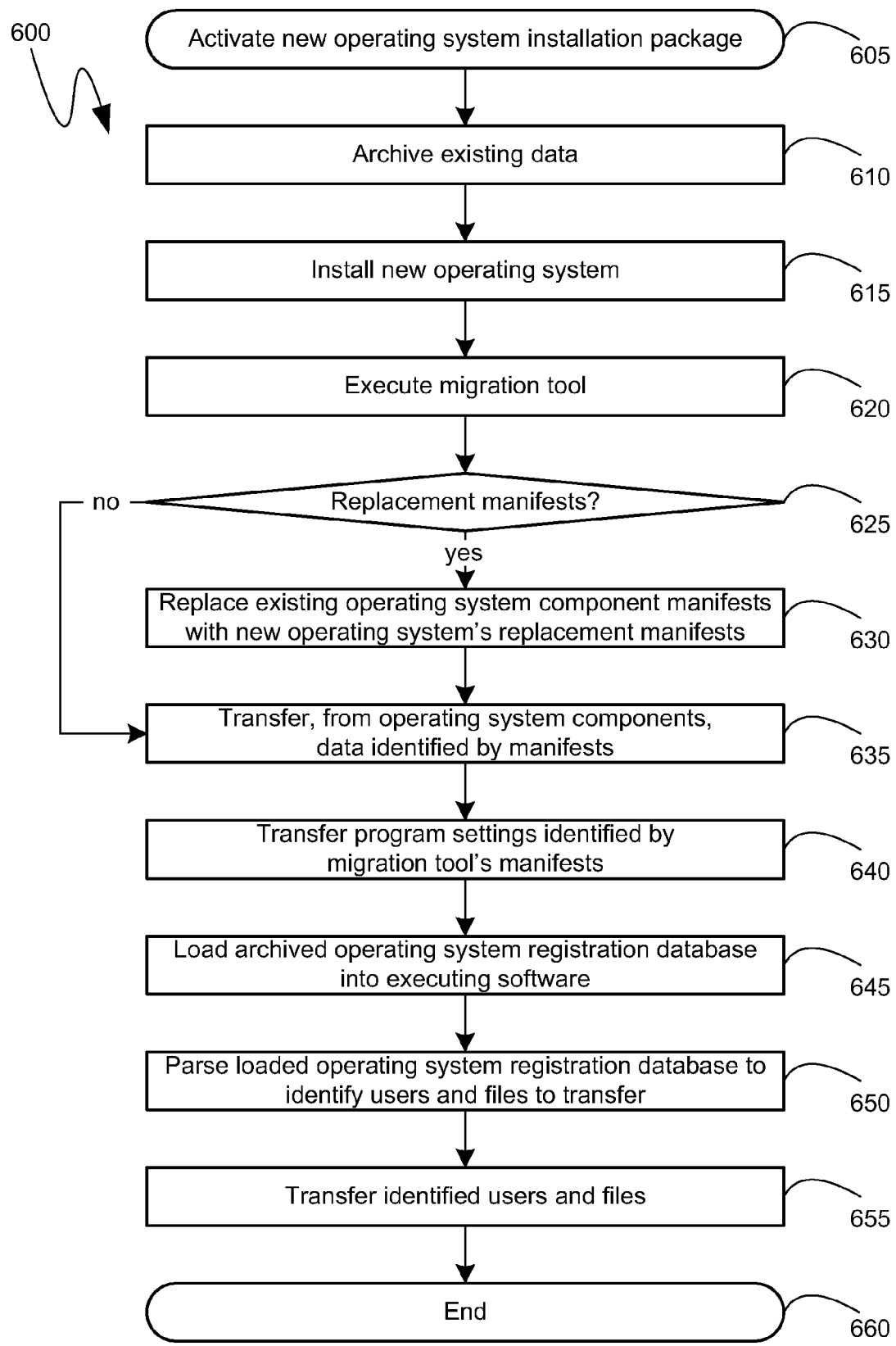
FIG. 6 is a flow diagram of an exemplary aspect of the migration of data from an archive to a newly installed operating system.
Figure 7:
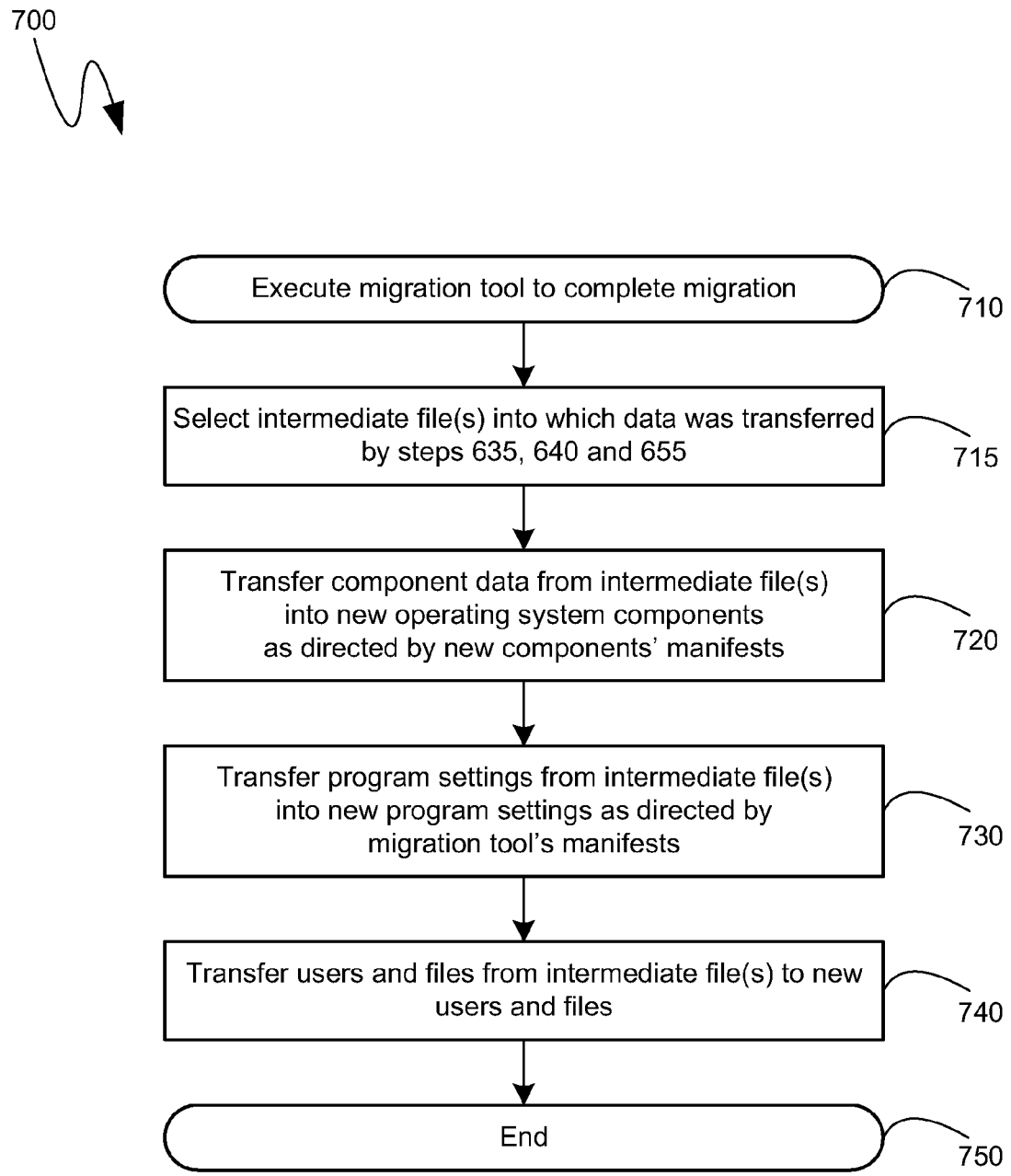
FIG. 7 is a flow diagram of another exemplary aspect of the migration of data from an archive to a newly installed operating system.

The above described migrations of files and data from operating system components, applications, registration databases and other like sources are described further with reference to the flow diagrams 600 and 700 of FIGS. 6 and 7, respectively. In particular, the flow diagram 600 of FIG. 6 illustrates one exemplary series of steps for transferring data and files to be migrated from an archive, while the flow diagram 700 of FIG. 7, then, illustrates one exemplary series of steps for transferring data and files from one or more intermediate files, should such files have been utilized during the performance of the relevant steps of the flow diagram 600, to a newly installed operating system, new computing device, or other destination for the migration.

Turning to the flow diagram 600 of FIG. 6, initially, at step 605, the installation package 210, described in detail above, can be activated to execute the installation instructions 220, also described above. Subsequently, the installation instructions 220 can archive some or all of the existing data on the computing device's storage media or, at least, on the storage media comprising the operating system 144. After the existing data is archived at step 610, the new operating system can be installed at step 615. In one embodiment, such an operating system installation can be a "fresh" installation, made without reference to the previously installed operating system.

At some point after the installation of a new operating system at step 615, after the new operating system has begun executing on the computing device 100, a migration tool, such as the migration tool 340 can be executed at step 620. The migration tool 340 can, at step 625, determine whether the new operating system 244 comprises any replacement manifests, such as the replacement manifest 379, described above. If, at step 625, it is determined that the new operating system 244 comprises such replacement manifests, the associated manifests in the offline operating system 144 can be replaced with those replacement manifests at step 630. Subsequently, at step 635, the data identified by manifests can be transferred from the operating system components associated with those manifests. If, at step 625, no replacement manifests were identified, then processing could proceed with the transferring of data at step 635 without replacing any manifests at step 630.

At step 640, program settings identified by manifests referenced by the migration tool 340, such as manifests that are part of the migration tool, or were otherwise provided with it or associated with it, can be transferred. At step 645 an operating system registration database 152 from the offline operating system 144 can be loaded into the new executing operating system 244 and can, at step 650, be parsed to identify users and files that are to be transferred. The identified users and files can then be transferred at step 655, such as in the manner described above. The currently described portion of a migration of data from a prior operating system to a new operating system can then end at step 660.

As will be known by those skilled in the art, the order of some of the steps illustrated by the exemplary flow diagram 600 is strictly for illustration and is not meant to limit the above descriptions to a particular order of the steps 605 through 660. In particular, the transferring of data at steps 635, 640 and 655 can be performed in any order, so long as the relevant precondition steps for those transferring steps have been performed. Thus, for example, the program files and settings transferred at step 640 can be performed prior to the transferring of operating system component data at step 635, or after the transferring of documents and user data at step 655, without affecting the result of the above described operations.

Turning to FIG. 7, an exemplary flow diagram 700 illustrates one embodiment for the retrieval of data from one or more intermediate files, such as intermediate files 350, that can have been created in the manner described above. Specifically, and with reference to flow diagram 600 of FIG. 6, the steps 635, 640, and 655 can have transferred the identified information, not directly, but rather to one or more intermediate files, such as the intermediate files 350. In such a case, the transfer of data from such intermediate files 350 can proceed as illustrated in the flow diagram 700 of FIG. 7. At an initial step 710, a migration tool, such as the migration tool 340, can be executed to transfer data from one or more intermediate files, such as the intermediate files 350, and, thereby complete the migration to a new operating system, such as the new operating system 244. The specific intermediate files, such as the intermediate files 350, from which the data is to be transferred, can be selected, as shown, at step 715.

Subsequently, at step 720, operating system component data can be transferred from the intermediate files 350 into new operating system components as directed by manifests associated with those components and also provided by the new operating system, such as in the manner described in detail above. At step 730, application program files and program settings can be transferred into appropriate locations relative to the new operating system 244 from the intermediate files 350, such as in accordance with one or more manifests associated with such programs, that can have been provided with, or associated with, the migration tool 340. At step 740, users, files, directories, and other such information collected by or associated with one or more users of the prior operating system 144 can be transferred from the intermediate files 350 in accordance with the information obtained from that prior operating system's operating system registration database 152. Processing can then end at step 750, as shown. As indicated previously, the order of steps 720, 730 and 740 is not relevant, and the order illustrated in the flow diagram 700 is strictly exemplary and not meant to limit the above descriptions to only the illustrated order.

As can be seen from the above descriptions, mechanisms for migrating data from an offline operating system have been provided. In view of the many possible variations of the subject matter described herein, we claim as our invention all such embodiments as may come within the scope of the following claims and equivalents thereto.

We claim:

1. One or more computer-readable storage devices comprising computer-executable instructions for migrating data from an archive, the computer-executable instructions directed to steps comprising:
   selecting data from operating system components of an offline operating system, in the archive, that is not executing, the offline operating system being an older version of a new operating system that is executing and is hosting execution of the computer-executable instructions, the selecting being performed in accordance with manifests associated with the operating system components of the offline operating system; and
   transferring the selected data to operating system components of the new operating system that are associated with the operating system components of the offline operating system from which the data was selected, the transferring being performed in accordance with manifests associated with the operating system components of the new operating system;
   wherein the operating system components of the offline operating system are not utilizable, from within the archive, except for the selecting and the transferring.

2. The computer-readable storage devices of claim 1, comprising further computer-executable instructions directed to replacing the manifests associated with the operating system components of the offline operating system with replacement operating system component manifests from the new operating system, the replacement operating system component manifests from the new operating system being newer versions of the manifests associated with the operating system components of the offline operating system.

3. The computer-readable storage devices of claim 1, wherein the manifests associated with the operating system components of the offline operating system were obtained from the new operating system.

4. The computer-readable storage devices of claim 1, comprising further computer-executable instructions directed to selecting, from the archive, application programs and application program settings, with reference to manifests associated with the application programs; and transferring the selected application programs and application program settings out of the archive so as to install the application programs on the new operating system and enable the application programs to be executed; wherein the application programs, as stored in the archive, are not executable on the new operating system.

5. The computer-readable storage devices of claim 4, wherein the manifests associated with the application programs are either specific to specific ones of the application programs or are generic manifests applicable to any of the application programs.

6. The computer-readable storage devices of claim 1, wherein the computer-executable instructions directed to the transferring from the operating system components of the offline operating system to the associated operating system components of the new operating system comprise computer-executable instructions directed to transferring the selected data from the operating system components of the offline operating system to one or more intermediate files; and transferring the selected data from the one or more intermediate files to the associated operating system components of the new operating system.

7. The computer-readable storage devices of claim 1, comprising further computer-executable instructions directed to: loading, on the new operating system, one or more files associated with an operating system registration database of the offline operating system; selecting data with reference to the one or more files associated with the operating system registration database of the offline operating system; transferring, to storage associated with the new operating system, the selected data in accordance with the one or more files associated with the operating system registration database of the offline operating system.

8. The computer-readable storage devices of claim 1, wherein the archive is only accessible to the computer-executable instructions.

9. A method for migrating data from an archive comprising the steps of: selecting data from operating system components of an offline operating system, in the archive, that is not executing, the offline operating system being an older version of a new operating system that is executing and is hosting the performance of the selecting and the transferring, the selecting being performed in accordance with manifests associated with the operating system components of the offline operating system; and
   transferring the selected data to operating system components of the new operating system that are associated with the operating system components of the offline operating system from which the data was selected, the transferring being performed in accordance with manifests associated with the associated operating system components of the new operating system;
   wherein the operating system components of the offline operating system are not utilizable, from within the archive, except for the selecting and the transferring.

10. The method of claim 9, further comprising the step of replacing the manifests associated with the operating system components of the offline operating system with replacement operating system component manifests from the new operating system, the replacement operating system component manifests from the new operating system being newer versions of the manifests associated with the operating system components of the offline operating system.

11. The method of claim 9, wherein the manifests associated with the operating system components of the offline operating system were obtained from the new operating system.

12. The method of claim 9, further comprising the steps of selecting, from the archive, application programs and application program settings, with reference to manifests associated with the application programs; and transferring the selected application programs and application program settings out of the archive so as to install the application programs on the new operating system and enable the application programs to be executed; wherein the application programs, as stored in the archive, are not executable on the new operating system.

13. The method of claim 12, wherein the manifests associated with the application programs are either specific to specific ones of the application programs or are generic manifests applicable to any of the application programs.

14. The method of claim 12, wherein the transferring from the operating system components of the offline operating system to the associated operating system components of the new operating system comprises transferring the selected data from the operating system components of the offline operating system to one or more intermediate files; and transferring the selected data from the one or more intermediate files to the associated operating system components of the new operating system.

15. The method of claim 9, further comprising the steps of: loading, on the new operating system, one or more files associated with an operating system registration database of the offline operating system; selecting data with reference to the one or more files associated with the operating system registration database of the offline operating system; transferring, to storage associated with the new operating system, the selected data in accordance with the one or more files associated with the operating system registration database of the offline operating system.

16. One or more computer-readable storage devices comprising computer-executable instructions for migrating from an old operating system to a new operating system while retaining selected data from the old operating system, the computer-executable instructions directed to steps comprising:
archiving the old operating system into an archive from which the old operating system is non-executable and from which components of the old operating system are not utilizable, except for by a migration tool comprising computer-executable instructions for selecting and transferring data from the operating system components of the old operating system in accordance with manifests associated with those operating system components;
installing, after the archiving, the new operating system in place of the old operating system, the new operating system being a newer version of the old operating system;
and executing, on the new operating system, after the archiving and the installing, the migration tool.

17. The computer-readable storage devices of claim 16, wherein the migration tool further comprises computer-executable instructions directed to steps comprising:
selecting data from the operating system components of the old operating system in accordance with the manifests associated with the operating system components of the old operating system; and
transferring the selected data to operating system components of the new operating system that are associated with the operating system components of the old operating system from which the data was selected, the transferring being performed in accordance with manifests associated with the operating system components of the new operating system.

18. The computer-readable storage devices of claim 17, wherein the migration tool further comprises computer-executable instructions directed to replacing the manifests associated with the operating system components of the old operating system with replacement operating system component manifests from the new operating system, the replacement operating system component manifests from the new operating system being newer versions of the manifests associated with the operating system components of the offline operating system.

19. The computer-readable storage devices of claim 17, wherein the migration tool further comprises computer-executable instructions directed to loading, on the new operating system, one or more files associated with an operating system registration database of the old operating system; selecting data with reference to the one or more files associated with the operating system registration database of the old operating system; transferring, to storage associated with the new operating system, the selected data in accordance with the one or more files associated with the operating system registration database of the old operating system.

* * * * *